United States Patent [19]

Barclay et al.

[11] 4,405,503

[45] Sep. 20, 1983

[54] PRODUCTION OF ZEOLITE AGGLOMERATES

[75] Inventors: John L. Barclay, Tadworth; John D. Hargrove, Aldershot; Richard J. Prince, Hampton, all of England

[73] Assignee: The British Petroleum Company Limited, London, England

[21] Appl. No.: 322,579

[22] Filed: Nov. 18, 1981

[30] Foreign Application Priority Data

Nov. 21, 1980 [GB] United Kingdom ............... 8037491

[51] Int. Cl.³ .................... B01J 37/00; B01J 29/18
[52] U.S. Cl. ............................................. 252/455 Z
[58] Field of Search .................................. 252/455 Z

[56] References Cited

U.S. PATENT DOCUMENTS

| | | | |
|---|---|---|---|
| 3,207,701 | 9/1965 | Curtin | 252/455 Z |
| 3,262,890 | 7/1966 | Mitchell et al. | 252/455 Z |
| 3,275,571 | 9/1966 | Mattox | 252/455 Z |
| 3,296,151 | 1/1967 | Heinze et al. | 252/455 Z |
| 3,367,884 | 2/1968 | Reid, Jr. | 252/455 Z |
| 3,629,351 | 12/1971 | Olive et al. | 252/455 Z |

FOREIGN PATENT DOCUMENTS 972833 10/1964 United Kingdom .
1134014 11/1968 United Kingdom .

*Primary Examiner*—Carl F. Dees
*Attorney, Agent, or Firm*—Morgan, Finnegan, Pine, Foley & Lee

[57] ABSTRACT

Strengthened zeolite molecular sieve agglomerates are prepared by treating the agglomerates with an aqueous solution of a water soluble silicon compound and subsequently with an aqueous solution of a mineral acid of sufficient strength to decationize the molecular sieve and/or increase its $SiO_2:Al_2O_3$ ratio. The strengthened agglomerates are suitable for use as catalyst supports.

8 Claims, No Drawings

PRODUCTION OF ZEOLITE AGGLOMERATES

This invention relates to the strengthening of zeolitic molecular sieve agglomerates, particularly mordenite based catalysts without significant loss of catalytic activity.

When producing zeolite particles suitable for use as catalysts or adsorbents, relatively small crystals or aggregates of crystals (e.g. zeolite powder) are formed into larger agglomerates, e.g. extrudates, pellets or granules. The agglomerates have to be reasonably strong and with certain zeolites it is acknowledged that bonding the small crystals together presents problems, although with others this can easily be done.

One solution is to use a binder, for example, kaolin or bentonite clays, usually in amount up to 30% by weight. However, this can give rise to further problems in respect of activity and/or strength, particularly in respect of bound aggregates which are subjected to acid treatment.

The combination of a hydrogenating metal or oxide component on mordenite has been disclosed in British Patent Specification 1,088,933 as a catalyst for the selective cracking of waxy hydrocarbons. Natural or freshly prepared synthetic mordenite has the formula:

$$M_{2/n}:Al_2O_3:9-11SiO_2.XH_2O,$$

where M is a metal cation, n is the valency of the cation and X is a variable between nil and 7 depending on the thermal history of the mordenite. M is commonly sodium. British Patent Specification 1,134,014 discloses that the mordenite is preferably decationised by treatment with mineral acid to effect both decationisation and removal of alumina so that the silica:alumina ratio of the decationised mordenite is increased to 14:1 at least.

Unbound aggregates can generally withstand such treatment without weakening. However, acid treatment may attack the binder in bound aggregates with the result that the product has a reduced crush strength and in the case of extrudate material in particular may render it unsuitable for use in commercial catalytic reactors.

British Patent Specification 972,833 discloses a method for hardening a crystalline zeolite molecular sieve agglomerate formed of such zeolite molecular sieve and a clay mineral binder, which comprises contacting the agglomerate in a hydrated state with an aqueous solution of an alkali metal silicate having a solid content of from 3% to 35% by weight to impregnate the agglomerate with the alkali metal silicate, separating the impregnated agglomerate from the solution and firing such impregnated agglomerate at a temperature of at least 343° C. and below the temperature at which the crystalline zeolitic molecular sieve loses its structural stability.

It should be noted that 972,833 discloses a method in which calcination takes place immediately after contact with the alkali metal silicate, apart from an optional rinse, and there is no treatment with acid. This in effect means that the agglomerates are hardened by the formation of a skin of an alkali metal silicate which, although it may improve the zeolite for desiccating purposes as described in 972,833, renders it less suitable for catalytic activities.

We have now discovered a method for strengthening zeolitic molecular sieve agglomerates, particularly of the bound variety, which enables them to retain (a) their strength to a satisfactory extent despite subsequent acid treatment and (b) their suitability for use as a catalyst support.

Thus according to the present invention there is provided a method for the preparation of a strengthened agglomerate based on a zeolitic molecular sieve which method comprises treating the agglomerate with an aqueous solution of water soluble silicon compound and subsequently with an aqueous solution of a mineral acid of sufficient strength to decationise the zeolitic molecular sieve and/or increase its $SiO_2:Al_2O_3$ ratio.

This method results in the strengthening of the molecular sieve by silica, and not by an alkali metal silicate as disclosed in 972,833. It is believed that this factor is responsible for the preservation of the active catalytic sites which would be suppressed by the method of 972,833.

Preferably the water-soluble silicon compound is an alkali metal silicate, most preferably sodium silicate.

The acid treatment may be effected by using a strong acid, e.g. sulphuric or hydrochloric acid, of from 5 to 50% by wt. strength, preferably from 10 to 20% by wt. A single treatment or two or more successive treatments may be given with acids of the strength stated above.

The temperature and time of the treatment with the water soluble silicon compound is not critical. If a silicate solution is used, a convenient method of treatment is to allow the agglomerate to soak in the silicate solution at ambient temperature for a period of time up to 24 hours.

The concentration of the solution is also not critical.

Although temperatures, times and concentrations are stated not to be critical in the sense that all can be used over wide ranges, the usual relationship exists between these parameters which should be taken into account when determining actual conditions. For example, a concentrated solution will produce a desired effect in a shorter time than a more dilute solution.

After contacting with the solution of the silicon compound, the agglomerate may be filtered, washed and dried, but should not be calcined before the acid treatment.

A very suitable material for treatment is mordenite, particularly when associated with a binder.

The temperature and time of the acid treatment again is not critical and a convenient method of treatment is to treat the molecular sieve with acid under reflux for a period of 2 to 12 hours.

The strengthened acid treated material may then be impregnated with a hydrogenating component by known methods to provide a hydrocarbon conversion catalyst, e.g. as described in British Patent Specifications 1,088,933 and 1,134,014.

The preferred hydrogenating component is a Group VIII metal, most preferably platinum.

Hydrocarbon conversion reactions known to be catalysed by such catalysts include hydrocracking, hydrogenation, dehydrogenation, isomerisation, disproportionation, dealkylation and selective cracking of n-paraffinic hydrocarbons from mixtures containing them. The precise feedstocks used will depend on the process to be employed, but they are preferably hydrocarbons or mixtures of hydrocarbons derived from petroleum. Thus, for hydrocracking and selective cracking of n-paraffinic hydrocarbons the feedstocks may be petroleum fractions boiling in the range 60°–600° C. preferably 250°–550° C.; for dealkylation, fractions containing $C_7$–$C_{15}$ alkyl aromatics; for isomerisation, n-paraffins or alkyl aromatics or fractions containing them, particularly fractions boiling in the range 35°–200° C.; for disproportionation, $C_7$–$C_9$ alkyl aromatics or fractions containing them; for hydrogenation, fractions containing cyclic or acyclic unsaturated hydrocarbons boiling within the range 30°–370° C., more particularly 30°–250° C.; and for dehydrogenation, naphthenes and/or paraffins or fractions containing them, particularly those boiling within the range 30°–250° C. The ranges of process conditions that may be used are summarised in the following Table 1.

TABLE 1

|  | Broad Range | Hydrocracking including dealkylation | Selective cracking of n-paraffins | Hydroisomerisation | Disproportionation | Hydrogenation | Dehydrogenation |
|---|---|---|---|---|---|---|---|
| Temperature °C. | 50–600 | 200–600 | 200–500 | 150–400 | 300–600 | 50–400 | 400–600 |
| Pressure bars | 0–200 | 15–200 | 15–200 | 0–70 | 0–100 | 0–200 | 0–100 |
| Space velocity treating v/v/hr | 0.1–20 | 0.2–10 | 0.2–10 | 0.2–10 | 0.1–20 | 0.1–20 | 0.1–10 |
| Hydrogen/ hydrocarbon mole ratio | 0.1–70:1 | 0.5–70:1 | 0.5–70:1 | 0.25–15:1 | 0.25–15:1 | 0.1–20:1 | 0–10:1 |

The invention is illustrated with reference to the following Examples. Example 2 is provided for purposes of comparison only.

EXAMPLE 1

Sodium mordenite extrudates (200 g) were allowed to stand in an aqueous solution (400 g) containing sodium silicate (20 g) for ten minutes. The extrudates were filtered, washed with distilled water, and then dried at 120° C.

They were then added to a 14% by wt. hydrochloric acid solution (800 g) and refluxed for 4 hours. The resulting hydrogen mordenite extrudates were washed thoroughly with water and then dried at 110° C. A sample was calcined at 550° C. and was found to have a mean crushing strength of 0.63 kg/mm.

EXAMPLE 2

Example 1 was repeated with the difference that the preliminary soak in the aqueous solution of sodium silicate was omitted. A sample of the resulting hydrogen mordenite extrudates after calcination at 550° C. was found to have a mean crushing strength of 0.28 kg/mm.

EXAMPLE 3

Samples of hydrogen mordenite after drying at 110° C. from Examples 1 and 2 were contacted with aqueous solutions of tetra-amine platinous chloride to give finished catalysts containing nominally 0.55% wt platinum. Following the platinum exchange step, the extrudates were dried at 120° C. and then calcined at 500° C. in flowing dry air.

The catalysts were used to dewax a Kuwait vacuum distillate (pour point +30° C.) at a hydrogen pressure of 68 bar, a space velocity of 1.0 v/v/hr and a gas recycle rate of 1530 m³/m³. Product pour points obtained at a catalyst temperature of 330° C. were used as a measure of catalyst activity. After 200–250 HOS, both catalysts had reached steady activity, giving pour points of −12° to 15° C.

These results clearly show that the treatment with sodium silicate results in a catalyst support which has a greater ability to withstand crushing and which also produces catalysts of unimpaired activity.

EXAMPLE 4

Sodium mordenite extrudates (200 g) were allowed to stand in an aqueous solution (400 g) containing sodium silicate (20 g) for ten minutes. The extrudates were filtered, washed with distilled water then added to a 14% by weight HCl solution (800 g) and refluxed for 4 hours. The resulting hydrogen mordenite extrudates were washed thoroughly with water and then dried at 110° C. A sample was calcined at 550° C. and was found to have a mean crushing strength of 0.70 kg/mm.

This example is identical to Example 1 except that the drying step after the silicate treatment is omitted without affecting the final strength. Thus, no heat treatment immediately after the silicate treatment is necessary.

We claim:

1. A method for the preparation of a strengthened agglomerate based on a zeolitic molecular sieve which method comprises treating the agglomerate with an aqueous solution of a water soluble silicon compound characterised by the fact that the zeolitic molecular sieve is subsequently treated with an aqueous solution of a mineral acid of sufficient strength to decationize the molecular sieve and/or increase its $SiO_2:Al_2O_3$ ratio.

2. A method according to claim 1 wherein the water soluble silicon compound is an alkali metal silicate.

3. A method according to either of the preceding claims wherein the mineral acid is sulphuric or hydrochloric acid.

4. A method according to claim 1 wherein the zeolitic molecular sieve is mordenite.

5. A method according to claim 4 wherein the mordenite is associated with a binder.

6. A method according to claim 1 wherein the treatment with the mineral acid directly follows the treatment with the soluble silicon compound, apart from optional washing and drying stages.

7. A method according to claim 1 wherein after the mineral acid treating step, the resulting agglomerate is impregnated with a hydrogenating component which is a Group VIII metal.

8. A method according to claim 1 wherein the acid is of sufficient strength to increase the $SiO_2:Al_2O_3$ ratio.

* * * * *